(12) United States Patent
Maricic et al.

(10) Patent No.: US 12,123,494 B2
(45) Date of Patent: Oct. 22, 2024

(54) PRESS-FIT-INTERLOCKING CONNECTION AND BELT TENSIONER HAVING SUCH A CONNECTION

(71) Applicant: Schaeffler Technologies AG & Co. KG, Herzogenaurach (DE)

(72) Inventors: Zoran Maricic, Fürth (DE); Alexander Kurz, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 393 days.

(21) Appl. No.: 17/621,227

(22) PCT Filed: Jun. 24, 2020

(86) PCT No.: PCT/DE2020/100535
§ 371 (c)(1),
(2) Date: Dec. 20, 2021

(87) PCT Pub. No.: WO2020/259758
PCT Pub. Date: Dec. 30, 2020

(65) Prior Publication Data
US 2022/0349456 A1  Nov. 3, 2022

(30) Foreign Application Priority Data
Jun. 26, 2019 (DE) .................. 10 2019 117 170.9

(51) Int. Cl.
*F16H 7/12* (2006.01)
*B23P 11/00* (2006.01)
(Continued)

(52) U.S. Cl.
CPC ............ *F16H 7/12* (2013.01); *B23P 11/00* (2013.01); *F16B 4/004* (2013.01);
(Continued)

(58) Field of Classification Search
CPC .. F16H 7/12; B23P 11/00; F16B 4/004; Y10T 29/4967; Y10T 29/49876; Y10T 29/4987
(Continued)

(56) References Cited

U.S. PATENT DOCUMENTS

| 4,826,347 | A |   | 5/1989 | Baril et al. |
|-----------|---|---|--------|--------------|
| 5,447,434 | A | * | 9/1995 | Shaw ............ A61C 8/005 411/924.1 |

(Continued)

FOREIGN PATENT DOCUMENTS

| DE | 102011088214 A1 | 6/2013 |
|----|------------------|--------|
| DE | 102015226218 A1 | 6/2017 |

(Continued)

OTHER PUBLICATIONS

DE 102016217933 A1 Maricic.Z (Year: 2018).*
See Corresponding Search Report for International Application PCT/DE2020/100535.

*Primary Examiner* — Henry Y Liu
(74) *Attorney, Agent, or Firm* — Davidson Kappel LLC

(57) ABSTRACT

A press-fit-interlocking connection of an inner part to an outer part which is fastened to the inner part includes a cylindrical press joint (3) between the outer part and the inner part. The interlocking connection is formed by an axial stop having contacting stop parts (18, 19) on the inner part and on the outer part. The connection has an edge support in contact with the stop parts which contact one another, in a first main plane of curvature ($E_1$) to which the cylinder axis of the press joint is perpendicular, with equal radii of curvature ($r_{a1}$, $r_{a2}$), and in a second main plane of curvature ($E_2$) in which the cylinder axis of the press joint lies, with different radii of curvature ($r_{a2}$, $r_{i2}$).

16 Claims, 4 Drawing Sheets

(51) Int. Cl.
  *F16B 4/00* (2006.01)
  *F16H 7/08* (2006.01)
(52) U.S. Cl.
  CPC ............... *F16H 2007/0806* (2013.01); *F16H 2007/0842* (2013.01); *F16H 2007/0865* (2013.01); *F16H 2007/0874* (2013.01); *F16H 2007/0893* (2013.01)
(58) Field of Classification Search
  USPC .......................................... 474/134; 403/282
  See application file for complete search history.

(56) References Cited

U.S. PATENT DOCUMENTS

| | | | | |
|---|---|---|---|---|
| 6,464,604 | B1 * | 10/2002 | Frankowski | F16H 7/1281 474/135 |
| 6,648,783 | B1 * | 11/2003 | Bogner | F16H 7/1281 474/134 |
| 6,929,079 | B2 * | 8/2005 | McDonough | E21B 10/16 175/420.1 |
| 7,285,065 | B2 * | 10/2007 | Dinca | F16H 7/24 474/135 |
| 7,946,938 | B2 * | 5/2011 | Hallen | F16H 7/1218 474/135 |
| 7,972,078 | B2 * | 7/2011 | Igarashi | F16D 1/101 403/359.1 |
| 7,980,167 | B2 * | 7/2011 | Schwarzkopf | F04B 27/1072 92/12.2 |
| 9,097,314 | B2 * | 8/2015 | Wolf | F16H 7/1281 |
| 9,169,888 | B2 * | 10/2015 | Nishimura | F16F 9/3235 |
| 9,709,137 | B2 * | 7/2017 | Walter | B60K 25/00 |
| 9,976,634 | B2 * | 5/2018 | Leucht | F02B 67/06 |
| 10,520,066 | B2 * | 12/2019 | Walter | F02B 67/06 |
| 10,876,606 | B2 * | 12/2020 | Singh | F16H 7/0831 |
| 11,624,426 | B2 * | 4/2023 | Singh | F16H 7/0831 474/134 |
| 2005/0218669 | A1 * | 10/2005 | Johnson | E05B 85/045 292/340 |
| 2009/0110568 | A1 * | 4/2009 | Schwarzkopf | F04B 27/1072 417/269 |
| 2009/0263181 | A1 * | 10/2009 | Kozlowski | F16D 1/076 403/77 |
| 2012/0073918 | A1 * | 3/2012 | Nishimura | B60G 13/06 188/266.2 |
| 2013/0040770 | A1 * | 2/2013 | Wolf | F16H 7/1281 474/134 |
| 2013/0189872 | A1 * | 7/2013 | Siahaan | B29C 45/1671 264/249 |
| 2014/0013888 | A1 * | 1/2014 | Trieschmann | C22C 37/04 74/434 |
| 2014/0048364 | A1 * | 2/2014 | Nishimura | F16F 9/325 188/297 |
| 2014/0287860 | A1 * | 9/2014 | Ma | F16H 7/1218 474/135 |
| 2014/0315673 | A1 * | 10/2014 | Zacker | F16F 1/04 474/135 |
| 2015/0308545 | A1 * | 10/2015 | Harvey | F16H 7/1218 474/117 |
| 2015/0345597 | A1 * | 12/2015 | Walter | F16H 7/1218 474/134 |
| 2015/0354675 | A1 * | 12/2015 | Hao | F16H 7/1281 474/90 |
| 2015/0369347 | A1 * | 12/2015 | Wolf | F16H 7/1281 474/134 |
| 2016/0146312 | A1 * | 5/2016 | Pfeifer | F16H 7/08 474/135 |
| 2017/0050689 | A1 * | 2/2017 | Johannsen | F16J 15/344 |
| 2017/0146100 | A1 * | 5/2017 | Walter | F02B 67/06 |
| 2018/0010670 | A1 * | 1/2018 | Leucht | F16H 7/1245 |
| 2018/0010692 | A1 * | 1/2018 | Seki | F16J 15/3496 |
| 2018/0202521 | A1 * | 7/2018 | Reuschel | F16H 7/1281 |
| 2018/0298995 | A1 * | 10/2018 | Reuschel | F16H 7/0838 |
| 2018/0320765 | A1 * | 11/2018 | Hauck | F16H 7/1281 |
| 2022/0349456 | A1 | 11/2022 | Maricic et al. | |

FOREIGN PATENT DOCUMENTS

| | | | |
|---|---|---|---|
| DE | 102016217933 A1 * | 3/2018 | ............... F16H 7/08 |
| DE | 102017109454 A1 | 11/2018 | |
| DE | 102018120933 A1 | 5/2019 | |
| EP | 202012100550 U1 | 5/2013 | |
| EP | 2593691 B1 | 6/2014 | |
| JP | 63126627 A | 5/1988 | |

* cited by examiner

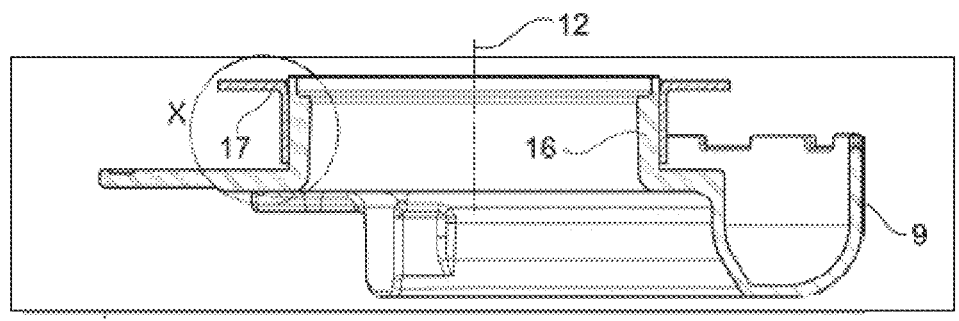
Fig. 4
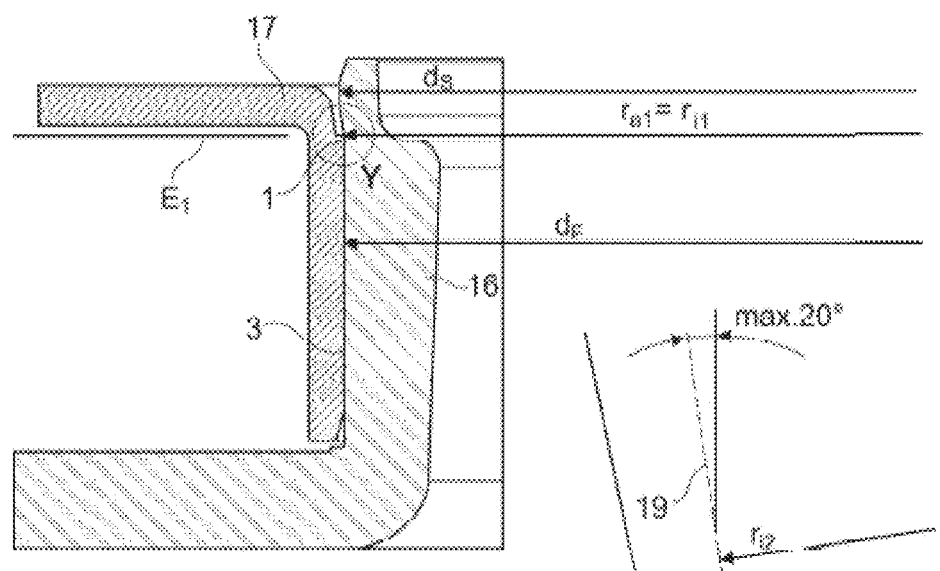
Fig. 5
Fig. 6

PRESS-FIT-INTERLOCKING CONNECTION AND BELT TENSIONER HAVING SUCH A CONNECTION

CROSS-REFERENCE TO RELATED APPLICATIONS

This application is the U.S. National Phase of PCT Appln. No. PCT/DE2020/100535 filed Jun. 24, 2020, which claims priority to DE 10 2019 117 170.9 filed Jun. 26, 2019, the entire disclosures of which are incorporated by reference herein.

The invention relates to a press-fit-interlocking connection of an inner part to an outer part which is fastened to the inner part, wherein:
- the press-fit connection comprises a cylindrical press joint between the outer part and the inner part
- and the interlocking connection is formed by an axial stop having contacting stop parts on the inner part and on the outer part.

BACKGROUND

Press-fit-interlocking connections in which an outer part and an inner part are joined together both by means of a (friction-locking) press fit and by means of an axial interlocking connection are known, for example, from DE 20 2012 100 550 U1, EP 2 593 691 B1 and DE 10 2015 226 218 A1. The interlocking connection prevents the two components from becoming axially detached from each other if the force fit fails as a result of an overload.

The present disclosure further relates to a belt tensioner of an accessory belt drive of an internal combustion engine. The belt drive comprises a generator with a generator pulley wrapped by the belt, with the belt tensioner comprising the following:
- a bearing flange fastened to the generator, which encloses the axis of rotation of the generator pulley,
- a first tension arm and a second tension arm, which are annular in shape and are mounted on the bearing flange so that they can pivot relative to one another,
- two tension pulleys attached to the tension arms, which apply pre-tensioning force to the belt in its direction of rotation in front of and behind the generator pulley,
- a spring clamped between the tension arms to generate the pre-tensioning force,
- and a locking sleeve connected to the first tension arm and fastened to a sleeve section of the first tension arm by means of a press-fit-interlocking connection.

The first tension arm is slidably supported radially against an inner lateral surface of the bearing flange by means of the locking sleeve, and the second tension arm is slidably supported radially against an outer lateral surface of the bearing flange.

Such a belt tensioner is known from DE 10 2018 120 933 A1. The press-fit-interlocking connection of the locking sleeve to the sleeve section of the first tension arm comprises a longitudinal press-fit-interlocking connection and a radially outward curling or caulking of the sleeve section as an interlocking connection.

SUMMARY

An object of the present disclosure is improving a press-fit-interlocking connection or a belt tensioner with a press-fit-interlocking connection with regard to increased security against loosening of the connection.

This object is achieved in regard to the press-fit-interlocking connection by means of an edge support in contact with the stop parts, which contact one other, both in a first main plane of curvature, to which the cylinder axis of the press joint is perpendicular, with equal radii of curvature of the same size, and in a second main plane of curvature, in which the cylinder axis of the press joint is located, with different radii of curvature.

The edge support, which forms the axial interlocking connection either as an end section of the press-fit or as a Hertzian contact with line contact, causes local material stresses by contact with the stop parts which, when the stop is subjected to axial load, are so excessive that the supporting edge penetrates the surface of the contact partner, which is accordingly elastically and, if necessary, also plastically deformed. Compared to pure surface contacts, this penetration reinforces the security of the interlocking connection against loosening in that the stop parts, figuratively speaking, dig into each other locally and thus additionally block the mutual displacement in the stop direction.

The object is achieved with regard to the belt tensioner by using the press-fit-interlocking connection according to the present disclosure for fastening the locking sleeve (outer part) on the sleeve section of the first tension arm (inner part).

Further features and advantageous embodiments of the present disclosure are apparent from the following description and from the drawings, which show a press-fit-interlocking connection according to the present disclosure on a belt tensioner for an accessory belt drive of an internal combustion engine. Unless otherwise mentioned, features or components that are the same or functionally the same are provided with the same reference signs.

BRIEF SUMMARY OF THE DRAWINGS

In the figures:
FIG. 4 shows the first tension arm of the belt tensioner with the locking sleeve joined to it in an isolated view;
FIG. 5 shows the detail X of FIG. 4;
FIG. 6 shows the detail Y of FIG. 5, wherein the joined components are shown schematically and simplified with mutual penetration.

DETAILED DESCRIPTION

Figure 1:
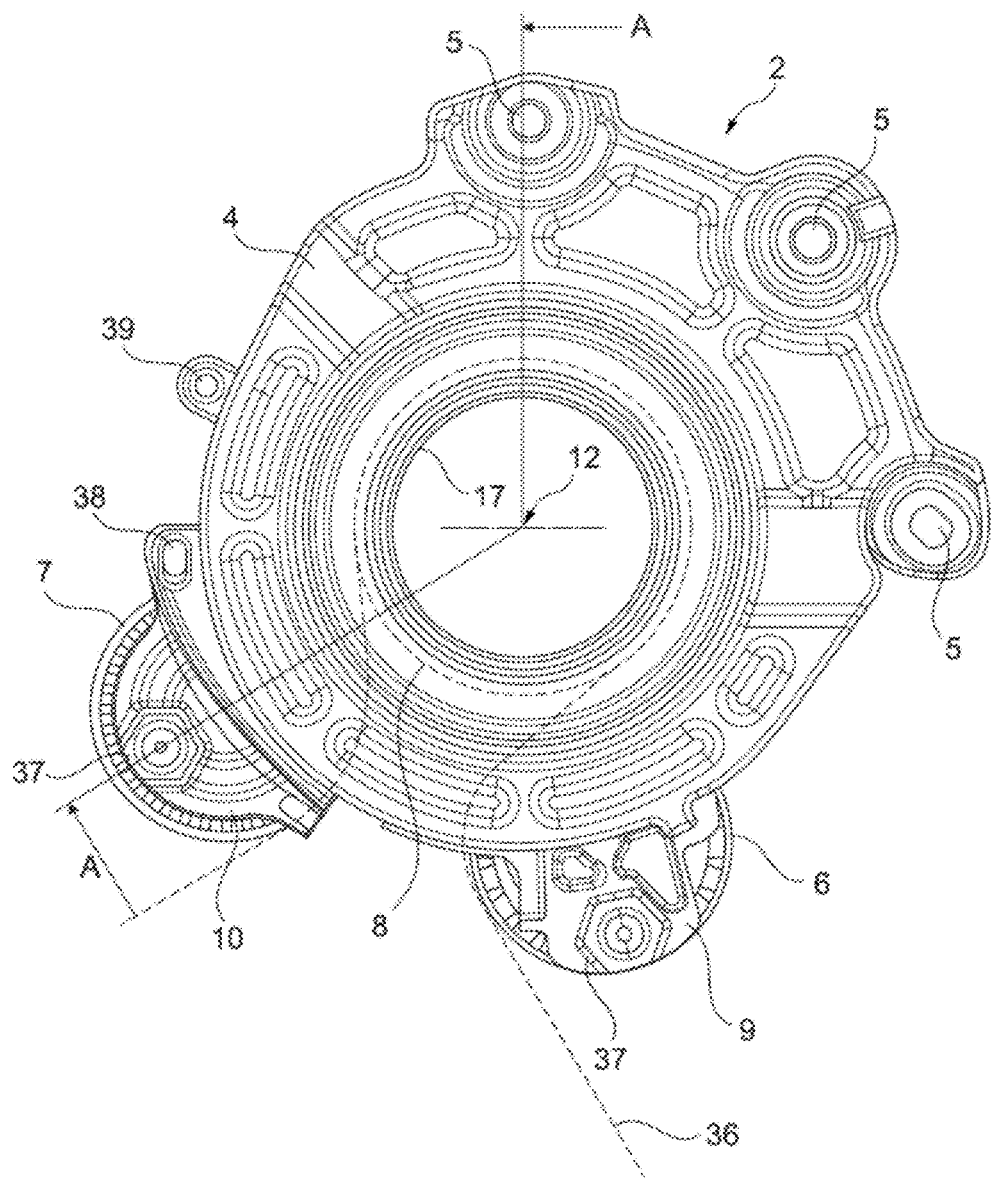
FIG. 1 shows the belt tensioner in a plan view.
Figure 2:
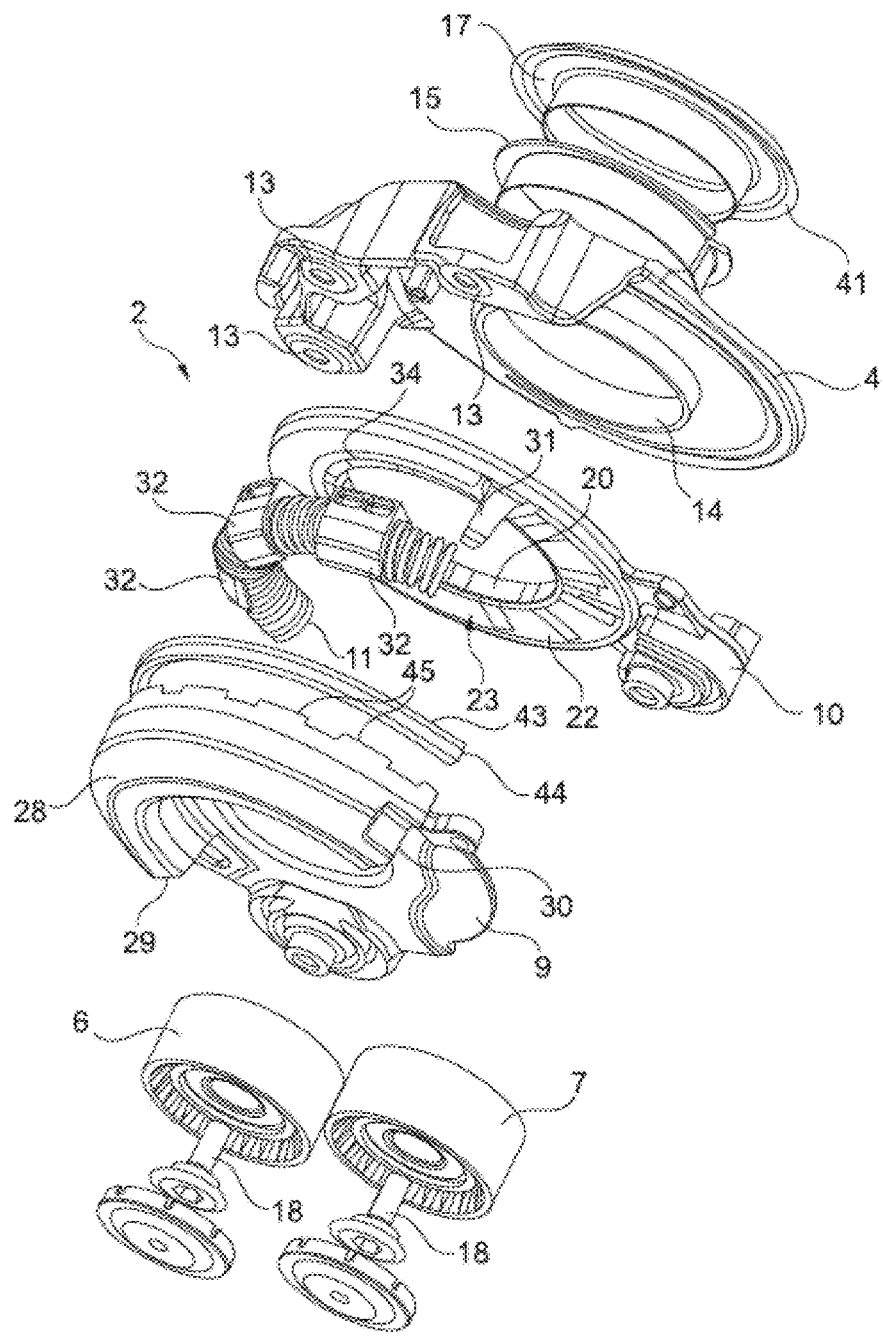
FIG. 2 shows the belt tensioner in an exploded view.
Figure 3:
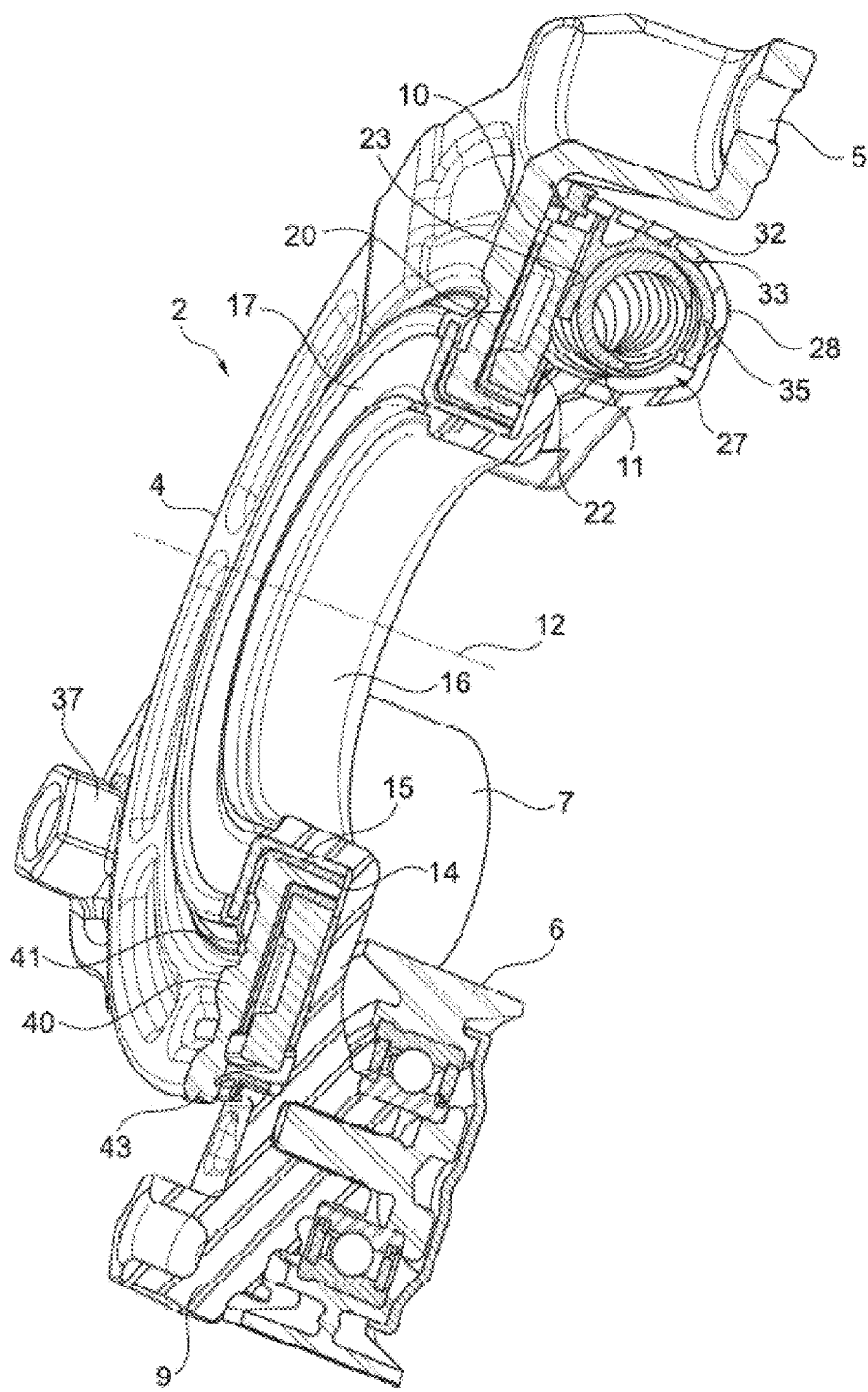
FIG. 3 shows the section A-A according to FIG. 1 in a perspective view.

FIGS. 1 to 3 show a belt tensioner 2 of an accessory belt drive of an internal combustion engine according to the present disclosure. Among other things, the belt drive drives a starter generator which, in a known manner, serves not only as a generator for power generation but also for starting up the belt or boosting the internal combustion engine and, in this case, is operated as a (driving) motor. The belt tensioner 2 is fastened by means of a bearing flange 4, which encloses the axis of rotation 12 of the generator pulley 8 (shown as a dashed line in FIG. 1), to three bearing surfaces 13 with screw-on points 5 on the front, i.e., belt-side, part of the starter generator and comprises two tension pulleys 6 and 7 which pre-tension the belt 36 (also shown as a dashed line in FIG. 1) in its direction of rotation in front of and behind the generator pulley 8. The tension pulleys 6, 7 are fastened to a first and second tension arm 9 and 10, respectively, each of which is of a closed annular design and slides radially and axially on the bearing flange 4 both relative to one another and relative to the starter generator. The mounting of the tension arms 9, 10 is concentric to the axis of rotation 12, but can alternatively be eccentric to it, as long as the generator pulley 8 and the wrapping belt 36 have sufficient clearance to the belt tensioner 2. The tension pulleys 6, 7 are fastened according to the so-called pulley-down design in each case by means of a screw 18, the screw head of which faces the starter generator.

The belt pre-tensioning force is generated by means of a spring 11 clamped between the tension arms 9, 10, wherein the tension pulleys 6, 7 pre-tension the slack side of the belt 36, which interchanges with the tight side depending on the operating state of the starter generator. The hexagon 37 formed on each tension arm 9, 10 serves in each case as an engagement for an assembly tool with which the two tension arms 9 and 10 can be spread apart against the spring force until a locking pin can then be inserted into two aligned locking bores 38 and 39 and fixes the two tension arms 9 and 10 against one another in this clamped (assembly) position.

The spring 11 generating the belt pre-tension is an arc spring which is accommodated parallel to the belt plane in a corresponding arc-shaped spring chamber 27. This is bounded axially on the one hand by a circumferentially arcuate bulge 28 of the first tension arm 9 and on the other hand by the end face 23 of the second tension arm 10, which is provided with a sliding bearing ring 22, and runs with the spring 11 accommodated therein in largely axial overlap with the tension pulleys 6, 7. The circumferential extension of the spring chamber 27 runs in the wrap-around region of the generator pulley 8 and is delimited by two walls 29 and 30 at the circumferential ends of the bulge 28.

As is generally known, an arc spring is always a helical compression spring with an arc-shaped open longitudinal extension. The spring 11 may either be manufactured already with an arcuate shape or, alternatively, as a straight helical compression spring which only deforms into an arcuate shape when inserted into the spring chamber 27. The arc spring combines the relatively high effective coefficient of a torsion spring with the circumferential restriction of the spring 11 to its arcuate installation space (the effective coefficient compares the absorbed energy of a spring with the maximum possible stored work for the same spring volume and material stress). This type of tensioner suspension allows the geometry of the annularly-closed tension arms 9, 10 to be favored in regard to the bearing design, since the spring 11 can be positioned essentially without problems in the wrap-around region of the generator pulley 8 due to the sufficiently high spring capacity and can thereby overlap axially with the tension pulleys 6, 7. In addition, the tension pulleys 6, 7 and thus the belt plane can run at a comparatively small axial distance from the starter generator, so that the moment load on the front generator shaft bearing remains small.

In particular, but nevertheless not only, in the case where an arc spring with an unfavorably large arc angle is required for spring coiling, two or more arc springs or straight helical compression springs can also be provided in series and a spring chamber 27 with an arc angle correspondingly adapted thereto. Independently of this, arc springs connected in parallel in the form of a spring assembly with an outer and an inner arc spring are also possible. With the help of these parameters, the overall characteristics of the tensioner suspension can be varied within wide limits.

The spring 11 is clamped between one wall 29 of the first tension arm 9 and a driver 31 of the second tension arm 10 to apply torque to the two tension pulleys 6, 7 toward one another. The driver 31 protrudes axially opposite the end face 23 and projects into the spring chamber 27 in front of the other wall 30. Due to the fact that the driver 31 runs completely or at least predominantly in axial overlap with the tension pulley 7, the pair of reaction forces introduced by the spring 11 and the tension pulley 7 generates a comparatively small tilting moment in the pivot bearing of the second tension arm 10.

Three U-shaped sliding shoes 32 are fixed to the outer arc of the spring 11, which support the reaction force of the spring 11 in the radially outward direction and axially on at least one of the tension arms 9, 10. In the present case, axial support is provided on both tension arms 9, 10. Radial support is provided by the sliding contact of the sliding shoes 32 with the arcuate outer shell 33 of the spring chamber 27. The axial support, which prevents axial deflection or buckling of the spring 11, is provided on the part of the starter generator by the sliding contact of the sliding shoes 32, which are essentially flat there, with the end face 23, which is metallically exposed in this contact area due to a recess 34 in the sliding bearing ring 22. On the opposite side, axial support is provided by the sliding contact of the sliding shoes 32 with the bottom 35 of the spring chamber 27.

The large number of sliding contacts, which in the embodiment shown are each formed by a plastic surface on the one hand and a metal surface on the other, results in considerable leeway for adjusting the friction and thus the operational damping characteristics of the belt tensioner 2. When matching the sliding contacts with regard to their respective material pairing, surface form and roughness and, if necessary, greasing, their relative movements must also be taken into account. These become larger, for example, between the sliding shoes 32 and the end face 23 of the second tension arm 10, when the sliding contacts are viewed starting from the driver 31 in the direction of the one wall 29. Conversely, the relative movements between the sliding shoes 32 on the one hand and the outer shell 33 and the bottom 35 of the spring chamber 27 on the other hand become smaller.

A bearing sleeve 14 is formed on the bearing flange 4, which, like the tensioning arms 9, 10, is designed as an aluminum die-cast part, against the inner surface of which the first tension arm 9 and the outer surface of the second tension arm 10 are radially slidably supported. The sliding bearing is provided radially on the inside by means of a sliding bearing ring 15 and radially on the outside by means of a sliding bearing ring 20, which, like the sliding shoes 32, are made of polyamide with embedded PTFE. The sliding bearing rings 15 and 20 each also serve as thrust bearings, with the sliding bearing ring 15 supporting the first tension arm 9 axially against the bearing flange 4 by means of a locking sleeve 17 connected thereto, and with the sliding bearing ring 20 supporting the second tension arm 10 axially against the bearing flange 4. The oppositely-directed axial bearing of the tension arms 9, 10 is provided by the sliding bearing ring 22.

A sealing lip 41 made of elastomer material enclosing the locking sleeve 17 lies in sealing contact with the end face 40 of the bearing flange 4 remote from the generator and protects the above-described sliding bearing against penetrating dirt and splash water. The generator-side sealing or shielding of the bearing points is achieved by means of a sealing lip 43 of an elastomeric sealing cord 44, which extends for the most part in the area of the spring chamber 27 and only over a circular arc with an arc angle of about 270°, where it is fitted axially on the first tension arm 9. This plug-in connection is secured against loosening both axially and rotationally by several segment-like axial projections 45 on the first tension arm 9 and corresponding grooves in the sealing cord 44. The axial gaps extending circumferentially outside the sealing cord 44 are sealed on both sides of the second tension arm 10 by dirt and water repellent labyrinths.

The locking sleeve 17 is a formed part made of sheet steel and fastened to the first tension arm 9 by means of a press-fit-interlocking connection according to the present disclosure. The press-fit-interlocking connection, which combines the frictional connection of a press-fit connection with an interlocking connection in the present case, is explained below with reference to FIGS. 4 to 6, both as a special design on the belt tensioner 2 and in general.

The press-fit connection is a longitudinal press connection with a cylindrical press joint 3 between the inner lateral surface of the locking sleeve 17 and the outer lateral surface of a sleeve section 16 of the first tension arm 9. In the general case of the press-fit-interlocking connection according to the present disclosure, the locking sleeve 17 represents the outer part and the sleeve section 16 represents the inner part to be connected to the outer part.

The interlocking connection is formed by an axial stop which, in addition to the press-fit connection, prevents displacement of the locking sleeve 17 relative to the sleeve section 16, which increases the axial clearance of the sliding bearings. The stop parts 18 and 19 of the axial stop, which are formed on the locking sleeve 17 and on the sleeve section 16, contact an edge support which, when the stop is subjected to an axial load, generates greatly excessive material stresses and consequently causes a mutual "digging in" of the contacting component surfaces.

The edge support is produced in the present case by the stop part 18 being a circumferential edge 1 formed in the locking sleeve 17 and located at the end of the press joint 3. Geometrically and/or expressed in terms of a Hertzian line contact, the stop parts 18, 19 contact one other in a first main plane of curvature $E_1$, to which the cylinder axis of the press joint 3, which is identical to the axis of rotation 12, is perpendicular, with radii of curvature $r_{a1}$ of the outer part and $r_{i1}$ of the inner part of equal size, and in a second main plane of curvature $E_2$, in which the cylinder axis of the press joint 3 lies, with radii of curvature $r_{a2}$ of the outer part and $r_{i2}$ of the inner part of different size. In the second main plane of curvature $E_2$, the curvatures of the stop parts 18, 19 are preferably convex on the one hand and non-concave on the other. In the present case, the stop part 18 of the outer part (locking sleeve 17) is convexly curved within the forming tolerance range $0 < r_{a2} < 1$ mm, and the stop part 19 of the inner part (sleeve section 16) is frustoconical and with $r_{i2} \sim \Box$ not curved. The stop part 19 of the inner part is inclined by a maximum of 20° relative to the cylinder axis of the press joint 3.

In the present embodiment, the longitudinal press-fit connection of the locking sleeve 17 on the sleeve section 16 requires elastic radial deformability of the component sections to be connected to the extent that the oversize of the stop parts 18, 19 to be overcome when pressing the locking sleeve 17 onto the sleeve section 16 is compensated for by the elastic deformation. The oversize of the stop parts 18, 19 to be overcome is, in the present case, the difference in diameter $d_S - d_F$, wherein:

$d_S$=the diameter of the press joint 3
$d_F$=the maximum diameter of the inner stop part 19

A significant advantage of the press-fit-interlocking connection produced in this way over the prior art cited at the outset is that the additional process step of caulking or roller burnishing to produce the interlocking connection is eliminated, and that consequently only a single joining step is required to produce the connection.

What is claimed is:

1. A press-fit-interlocking connection of an inner part to an outer part which is fastened to the inner part, the press-fit-interlocking connection comprising:
   a cylindrical press joint between the outer part and the inner part, the press-fit-interlocking connection being formed by a press fit between an inner circumferential surface of the outer part an outer circumferential surface of the inner part and an axial stop, the axial stop being formed by the inner part extending radially outward into the outer part and contacting a circumferential edge of the outer part.

2. The press-fit-interlocking connection according to claim 1, wherein a contact between the inner part and the circumferential edge of the outer part is a Hertzian line contact.

3. The press-fit-interlocking connection according to claim 1, wherein in a plane radially intersecting the axial stop, the outer part has a convex curvature and the inner part has a non-concave curvature.

4. The press-fit-interlocking connection according to claim 3, wherein in the plane radially intersecting the axial stop, the outer part is convexly curved and the inner part is not curved.

5. The press-fit-interlocking connection according to claim 4, wherein in the plane radially intersecting the axial stop, the inner part is inclined by a maximum of 20° relative to the cylinder axis of the cylindrical press joint.

6. The press-fit-interlocking connection according to claim 4, wherein the outer part is made of steel and the inner part is made of aluminum, wherein in the plane radially intersecting the axial stop the following applies to a radius of curvature of the outer part:

$$0 < r_{a2} < 1 \text{ mm}.$$

7. The press-fit-interlocking connection according to claim 1, wherein the press-fit connection is a longitudinal press-fit connection, wherein the outer part and the inner part have, in a region of the press-fit connection, an elastic radial deformability which compensates for an oversize of the inner part and the outer part to be overcome when the outer part is pressed onto the inner part.

8. A belt tensioner of an accessory belt drive comprising a generator having a generator pulley wrapped by a belt, the belt tensioner comprising:
   a bearing flange configured for being fastened to the generator, the bearing flange enclosing an axis of rotation of the generator pulley;
   a first tension arm and a second tension arm, the first and second tension arms each being annular in shape and being mounted on the bearing flange so that the first and second tension arms can pivot relative to one another;
   two tension pulleys attached to the tension arms, the two tension pulleys configured for applying a pre-tensioning force to the belt in a direction of rotation of the belt in front of and behind the generator pulley;
   a spring clamped between the first and second tension arms to generate the pre-tensioning force;
   and a locking sleeve connected to the first tension arm and fastened to a sleeve section of the first tension arm by a press-fit-interlocking connection, the press-fit-interlocking connection including a cylindrical press joint and an axial stop, the axial stop being formed by the sleeve section of the first tension arm extending radially outward into the locking sleeve and contacting a circumferential edge of the locking sleeve, wherein the first tension arm is slidably supported radially against an inner lateral surface of the bearing flange by the locking sleeve, and the second tension arm is slidably supported radially against an outer lateral surface of the bearing flange.

9. The belt tensioner according to claim 8, wherein a contact between the sleeve section of the first tension arm and the circumferential edge of the locking sleeve is a Hertzian line contact.

10. The belt tensioner according to claim 8, wherein in in a plane radially intersecting the axial stop, the locking sleeve is convexly curved and the sleeve section of the first tension arm is frustoconical.

11. The belt tensioner according to claim 8, wherein in the plane radially intersecting the axial stop, the sleeve section of the first tension arm is inclined by a maximum of 20° relative to the cylinder axis of the cylindrical press joint.

12. The belt tensioner according to claim 8, wherein the locking sleeve is made of steel and the sleeve section of the first tension arm is made of aluminum.

13. A method of constructing an accessory belt drive comprising a generator having a generator pulley wrapped by a belt, the method comprising:

pivotably mounting a first tension arm and a second tension arm on a bearing flange configured for enclosing an axis of rotation of the generator pulley; and press-fitting a locking sleeve to a sleeve section of the first tension to form a cylindrical press joint and an axial stop forming an interlocking connection between the locking sleeve and the sleeve section, the an axial stop being formed by the locking sleeve engaging the sleeve section to prevent displacement of the locking sleeve relative to the sleeve section, the interlocking connection being formed by a circumferential edge formed in the locking sleeve and located at an end of the cylindrical press joint, the axial stop being formed by the sleeve section of the first tension arm being pressed radially outward into the locking sleeve and into contact with the circumferential edge of the locking sleeve.

14. The method as recited in claim 13 wherein in a plane radially intersecting the axial stop, the locking sleeve is convexly curved and the sleeve section of the first tension arm is frustoconical.

15. The method as recited in claim 13 wherein in the plane radially intersecting the axial stop, the sleeve section of the first tension arm is inclined by a maximum of 20° relative to the cylinder axis of the cylindrical press joint.

16. The method as recited in claim 13 wherein the locking sleeve and the sleeve section elastically deform radially when the locking sleeve is pressed onto the sleeve section.

* * * * *